(12) United States Patent
Im (10) Patent No.: US 8,793,270 B2
(45) Date of Patent: *Jul. 29, 2014

(54) SYSTEM AND METHOD FOR PROVIDING PERSONALIZED RECOMMENDED WORD AND COMPUTER READABLE RECORDING MEDIUM RECORDING PROGRAM FOR IMPLEMENTING THE METHOD

(75) Inventor: Kyoo Min Im, Seoul (KR)

(73) Assignee: NHN Corporation, Seongnam-si (KR)

( * ) Notice: Subject to any disclaimer, the term of this patent is extended or adjusted under 35 U.S.C. 154(b) by 611 days.

This patent is subject to a terminal disclaimer.

(21) Appl. No.: 12/246,468

(22) Filed: Oct. 6, 2008

(65) Prior Publication Data

US 2009/0049020 A1 Feb. 19, 2009

Related U.S. Application Data

(63) Continuation of application No. PCT/KR2007/000963, filed on Feb. 26, 2007.

(30) Foreign Application Priority Data

Apr. 6, 2006 (KR) .................. 10-2006-0031509

(51) Int. Cl.
*G06F 17/30* (2006.01)

(52) U.S. Cl.
USPC .......................................... 707/767; 707/768

(58) Field of Classification Search
CPC .......... G06F 17/3064; G06F 17/30864; G06F 17/30672; G06F 17/30666
See application file for complete search history.

(56) References Cited

U.S. PATENT DOCUMENTS

| | | | | |
|---|---|---|---|---|
| 5,832,478 | A * | 11/1998 | George | 1/1 |
| 6,166,733 | A * | 12/2000 | Yamada | 715/776 |
| 6,564,213 | B1 * | 5/2003 | Ortega et al. | 1/1 |
| 6,714,906 | B1 * | 3/2004 | Ji et al. | 704/10 |
| 6,848,075 | B1 | 1/2005 | Becker et al. | |
| 7,092,936 | B1 * | 8/2006 | Alonso et al. | 707/737 |
| 7,716,235 | B2 * | 5/2010 | Davallou | 707/766 |
| 7,761,286 | B1 * | 7/2010 | Lawler | 704/1 |
| 7,890,526 | B1 * | 2/2011 | Brewer et al. | 707/767 |
| 7,917,528 | B1 * | 3/2011 | Dave et al. | 707/766 |
| 7,996,419 | B2 * | 8/2011 | Pfleger | 707/768 |
| 8,065,316 | B1 * | 11/2011 | Baker et al. | 707/768 |
| 2003/0009451 | A1 * | 1/2003 | Bates et al. | 707/3 |
| 2003/0206123 | A1 * | 11/2003 | Robbins | 341/27 |
| 2004/0006458 | A1 * | 1/2004 | Fux et al. | 704/8 |
| 2005/0102259 | A1 * | 5/2005 | Kapur | 707/1 |
| 2005/0222989 | A1 * | 10/2005 | Haveliwala et al. | 707/3 |

(Continued)

FOREIGN PATENT DOCUMENTS

| | | |
|---|---|---|
| JP | 2001-249933 | 9/2001 |
| JP | 2003-173342 | 6/2003 |

(Continued)

*Primary Examiner* — Daniel Kinsaul (74) *Attorney, Agent, or Firm* — Greer Burns & Crain Ltd.

(57) ABSTRACT

A system and method for providing a user-customized recommended word or words is provided, in which a recommended service log stored in a user terminal is classified according to at least one index, the indexed recommended service log is respectively stored for each index, and the user-customized recommended word or words are extracted in association with a user input query being inputted to a web browser of the user.

20 Claims, 6 Drawing Sheets

(56) References Cited

U.S. PATENT DOCUMENTS

| | | | |
|---|---|---|---|
| 2005/0283468 A1* | 12/2005 | Kamvar et al. | 707/3 |
| 2006/0074885 A1* | 4/2006 | Chiu et al. | 707/3 |
| 2006/0106769 A1* | 5/2006 | Gibbs | 707/3 |
| 2006/0129533 A1* | 6/2006 | Purvis | 707/3 |
| 2006/0136208 A1* | 6/2006 | Chung et al. | 704/251 |
| 2006/0206306 A1* | 9/2006 | Cao et al. | 704/4 |
| 2008/0065617 A1* | 3/2008 | Burke et al. | 707/5 |

FOREIGN PATENT DOCUMENTS

| | | |
|---|---|---|
| JP | 2005-078501 | 3/2005 |
| KR | 1020000045107 A | 7/2000 |
| KR | 1020010112707 A | 12/2001 |
| KR | 1020020025142 A | 4/2002 |
| KR | 1020030078813 A | 10/2003 |
| KR | 1020040006515 A | 1/2004 |
| KR | 1020040062900 A | 7/2004 |
| KR | 100643801 B1 | 11/2006 |

* cited by examiner

| CONSONANT/VOWEL UNIT | RECOMMENDED SERVICE LOG | SYLLABLE UNIT | RECOMMENDED SERVICE LOG | SUFFIX | RECOMMENDED SERVICE LOG |
|---|---|---|---|---|---|
| K | KOOKMIN BANK | GA | GAME RECOMMENDATION | BANK | KOOKMIN BANK |
|  | KYOBO BOOK STORE |  | GAME RANKING |  | WOORI BANK |
|  | ... |  | ... |  | ... |
| N | NALSSI | BL | BLOG | MARKET | G MARKET |
|  | NONGHYUP |  | BLUETOOTH |  | ZERO MARKET |
|  | ... |  | ... |  | ... |
| D | DONKEY | AUC | AUCTION | COUPON | DISCOUNT COUPON |
|  | DISH |  | AUCTIVA |  | PIZZA COUPON |
|  | ... |  | ... |  | ... |
| ... |  | ... |  | ... |  |

FIG. 4

| D | | | | SEARCH |
|---|---|---|---|---|
| V RECOMMENDED KEY WORD | WORDS | HELP : SKIP | | |
| DICTIONARY | × | | | |
| DELL | × | | | |
| DISNEY CHANNEL | × | | | |
| | | | | |
| DICTIONARY | | | | |
| DELTA | | | | |
| DIMPLE | | | | |
| DOMINO | | | | |

SYSTEM AND METHOD FOR PROVIDING PERSONALIZED RECOMMENDED WORD AND COMPUTER READABLE RECORDING MEDIUM RECORDING PROGRAM FOR IMPLEMENTING THE METHOD

CROSS-REFERENCES TO RELATED APPLICATIONS

This is a continuation of International Application PCT/KR2007/000963 filed Feb. 26, 2007, designating the United States and published on Oct. 11, 2007 as WO 2007/114563 A1, which claims priority to Korean application 10-2006-0031059, filed Apr. 6, 2006. The entire contents of the aforementioned patent applications are incorporated herein by this reference.

TECHNICAL FIELD

The present invention relates to a system and method for providing a user-customized recommended word, in which a recommended service log stored in a user terminal is classified according to at least one index, the indexed recommended service log is respectively stored for each index, the user-customized recommended word is extracted in association with a user input query being inputted to a web browser of a user.

BACKGROUND ART

When a query is entered from a user, a search website, which provides a search service, generally provides search results corresponding to the query, for example, web sites including the query, articles including the query, and images including the query as a file name.

Search services are currently being improved to increase users' conveniences. Accordingly, when a user enters an appropriate query, the search service must provide satisfactory search results. Also, even when the user enters an inappropriate query, the search service must provide appropriate search results which can satisfy the user. Specifically, as users of search service are being expanded and also the number of users who do not have enough background knowledge about appropriate queries increases, it is required to guide the users to make an appropriate query.

Accordingly, recently, to satisfy a user's need, a search web site provides a search query appropriate for a query input status of the user. As an example, while the user inputs a query 'Na', the search web site provides the user with search queries such as 'Nate', 'NateOn', 'Naver', and 'Nate.com', the user clicks a search query to input from among the provided search queries such as 'Nate', 'NateOn', 'Naver', and 'Nate.com', subsequently the user may input a desired search query without inputting a complete search query. The search queries are provided in an order of higher search frequency, or provided in alphabetical order.

Also, search sites calculate search frequency of all users, and provide search queries in an order of the higher search frequency of all users since frequently visited search sites or frequently searched keywords are different depending on each user's interest and inclination. That is, since search sites provide users with a uniformed search query without considering user's individual interest and taste, when a required search query is exposed to the user, it would be a good informative service to the user, however, conversely, when an unnecessary search query is exposed to the user, it would be spam.

As an example, when a first user frequently searches for 'diamonds', 'DaDa', and 'Daum' with respect to a query 'D', and when a search site provides the first user with search queries such as 'Daum', 'Daum Cafe', and 'DaMoIm', the search queries except 'Daum' would be spam for the first user.

Accordingly, a new service which can individualize a search query for each user, and can provide each user with a user-customized search query is required.

SUMMARY OF DISCLOSURE

An aspect of the present invention provides a method and system for providing a user-customized recommended word or words, which can provide each user with a user-customized recommended word or words, that is an individualized recommended word or words providing service for the each user, in which a recommended service log stored in a user terminal is classified according to at least one index, the indexed recommended service log is respectively stored for each index, and the user-customized recommended word or words are extracted in association with a user input query being inputted to a web browser of the user.

Another aspect of the present invention also provides a method and system for providing a user-customized recommended word or words, in which a user can easily input a keyword without having to input a complete keyword by selecting the keyword from a user-customized recommended word or words provided to the user.

Another aspect of the present invention also provides a method and system for providing a user-customized recommended word or words, which can respectively provide each user with a different user-customized recommended word or words since a recommended service log is classified to be stored for the each user, the recommended service log is indexed according to each index to be stored for the each user, a user input query being inputted to a web browser of the user is identified, and a user-customized recommended word or words associated with the user input query are provided in the recommended service log associated with the user.

Another aspect of the present invention also provides a method and system for providing a user-customized recommended word or words, which can identify a user who has inputted a user input query by using a user identification (ID), IP address information, and cookie information of the user.

According to an aspect of the present invention, there is provided a system for providing a user-customized recommended word or words including: a log indexer indexing a recommended service log according to a consonant/vowel unit, a syllable unit, or a suffix stored in a user terminal; a user-customized recommended word storage unit classifying the indexed recommended service log according to the consonant/vowel unit index, the syllable unit index, or the suffix index, and storing the classified recommended service log; a user-customized recommended word extraction unit identifying a user input query being inputted to a web browser of the user, and extracting at least one user-customized recommended word associated with the user input query from the user-customized recommended word storage unit; and a user-customized recommended word output unit outputting the extracted user-customized recommended word or words to the web browser.

According to another aspect of the present invention, there is provided a system for providing a user-customized recommended word including: a recommended service log database classifying a recommended service log for each user, and storing the classified recommended service log for each user; a log indexer indexing a recommended service log stored in the recommended service log database according to a consonant/vowel unit, a syllable unit, or a suffix; a user-customized recommended word database classifying the indexed recommended service log according to the consonant/vowel unit index, the syllable unit index, or the suffix index, and storing the classified recommended service log for each user; a web server receiving a user input query from a web browser of the user, identifying user identification information of the user, who has inputted the user input query, transmitting the user identification information to a predetermined query autocomplete server, receiving at least one user-customized recommended word from the query autocomplete server, and transmitting the user-customized recommended word or words to the web browser; and a query autocomplete server receiving the user input query and the user identification information from the web server, and extracting the user-customized recommended word or words associated with the user input query from the user-customized recommended word database associated with the user identification information to transmit the extracted user-customized recommended word or words to the web server.

According to another aspect of the present invention, there is provided a method for providing a user-customized recommended word or words including: indexing a recommended service log stored in a user terminal according to a consonant/vowel unit, a syllable unit, or a suffix; classifying the indexed recommended service log according to the consonant/vowel unit index, the syllable unit index, or the suffix index, and storing the classified recommended service log; identifying a user input query being inputted to a web browser of the user; extracting at least one user-customized recommended word associated with the user input query from the user-customized recommended word storage unit; and outputting the extracted user-customized recommended word or words to the web browser.

According to another aspect of the present invention, there is provided a method for providing a user-customized recommended word or words including: classifying a recommended service log for each user, and storing the classified recommended service log in a recommended service log database; indexing the stored recommended service log according to a consonant/vowel unit, a syllable unit, or a suffix, from a predetermined log indexer; classifying the indexed recommended service log according to the consonant/vowel unit index, the syllable unit index, or the suffix index, and storing the indexed recommended service log in a user-customized recommended word database; receiving a user input query in a predetermined web server from a web browser, identifying user identification information of the user, who has inputted the user input query, and transmitting the user identification information to a predetermined query autocomplete server; receiving the user input query and the user identification information from the web server in the query autocomplete server, extracting at least one user-customized recommended word associated with the user input query from the user-customized recommended word database associated with the user identification information, and transmitting the extracted user-customized recommended word or words to the web server; and receiving the user-customized recommended word or words from the query autocomplete server in the web server, and transmitting the received user-customized recommended word or words to the web browser.

BRIEF DESCRIPTION OF DRAWINGS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

DETAILED DESCRIPTION OF PREFERRED EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
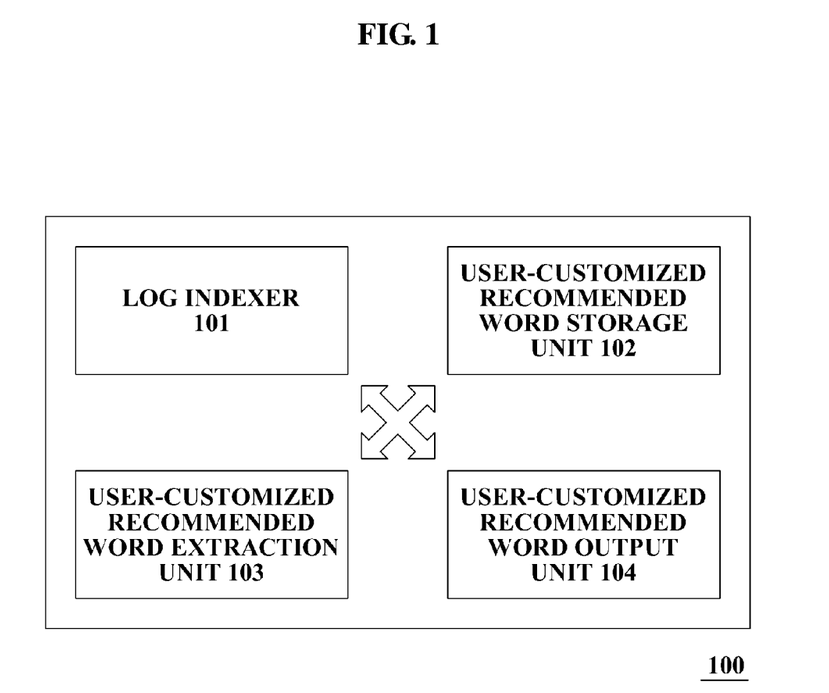
FIG. 1 is a block diagram illustrating a configuration of a system for providing a user-customized recommended word according to an embodiment of the present invention.

FIG. 1 is a block diagram illustrating a configuration of a system 100 for providing a user-customized recommended word according to an embodiment of the present invention.

The system 100 for providing the user-customized recommended word according to the embodiment of the present invention includes a log indexer 101, a user-customized recommended word storage unit 102, a user-customized recommended word extraction unit 103, and a user-customized recommended word output unit 104. The log indexer 101 indexes a recommended service log stored in a user terminal according to a consonant/vowel unit, a syllable unit, or a suffix. The user-customized recommended word storage unit 102 classifies the indexed recommended service log according to the consonant/vowel unit index, the syllable unit index, or the suffix index, and stores the classified recommended service log. The user-customized recommended word extraction unit 103 identifies a user input query being inputted to a web browser of the user, and extracts at least one user-customized recommended word associated with the user input query from the user-customized recommended word storage unit 102. The user-customized recommended word output unit 104 outputs the extracted user-customized recommended word or words to the web browser.

According to the embodiment of the present invention, the system 100 for providing the user-customized recommended word is performed in the user terminal, and stores the recommended service log using cookie information of the user terminal.

Figure 2:
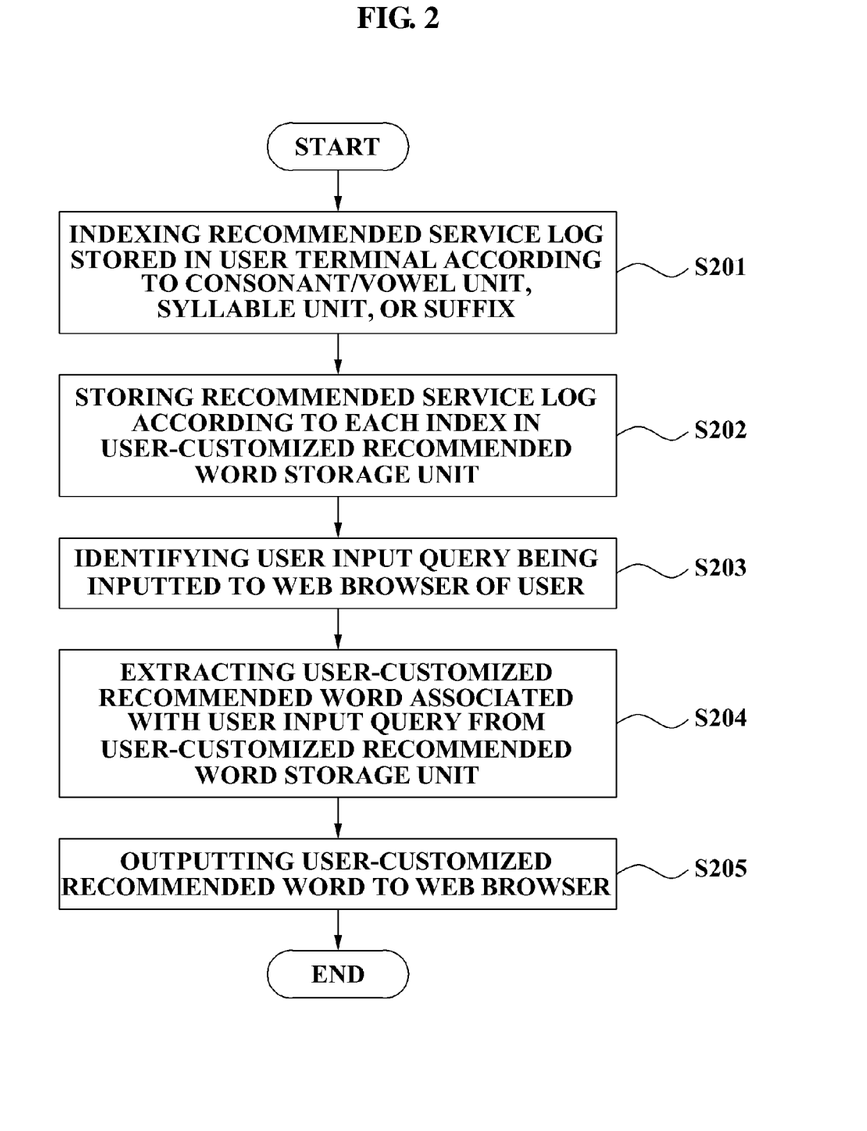
FIG. 2 is a flowchart illustrating a method for providing a user-customized recommended word according to another embodiment of the present invention.

FIG. 2 is a flowchart illustrating a method for providing a user-customized recommended word according to another embodiment of the present invention. The method for providing the user-customized recommended word according to another embodiment of the present invention may be performed by the system 100 for providing the user-customized recommended word of FIG. 1.

In operation S201, the log indexer 101 of the system 100 for providing the user-customized recommended word indexes the recommended service log stored in the user terminal according to the consonant/vowel unit, the syllable unit, or the suffix. According to the present embodiment, the system 100 for providing the user-customized recommended word may be provided in a user terminal in a program type to be performed. In this instance, the system 100 for providing the user-customized recommended word stores the recommended service log using cookie information of the user terminal.

A cookie generally indicates information which serves as a medium between a user and a web site by storing the user's visit history to an Internet web site, the cookie storing a user ID and a password is generated when a user visits a predetermined web site first time, and when the user visits the Internet web site again later, the user can quickly connect to the Internet web site due to the cookie without an additional process. In the present invention, a keyword being inputted by the user when the user connects to the Internet web site is stored as cookie information, accordingly the keyword is used for the recommended service log.

A frequently visited web site or a frequently searched keyword is determined since users have their own interest and inclination. Accordingly, the recommended service log is stored using the cookie information to provide the user with the user's frequently searched keyword as a user-customized recommended word.

The recommended service log may be differently stored for each terminal of each user. As an example, when a recommended service log being stored in a user terminal of user A is different from a recommended service log being stored in a user terminal of user B, a user-customized recommended word may be provided based on a recommended service log which has been inputted by each user.

As described above, the recommended service log is a keyword which is inputted by the user at least one time, and may include search frequency for each of the recommended service log. The search frequency may be a kind of statistical information which is generated by analyzing how often the user searches for a specific recommended service log.

Also, a single recommended service log may be indexed using a single method, and also may be divided into a consonant/vowel unit, a syllable unit, or a suffix according to indexed methods. As an example, a recommended service log 'naver' is indexed in consonant/vowel units such as 'N' and 'v.'

In this instance, the search frequency may be, for example, a type of statistical information which is generated by analyzing how many times a particular query has been inputted during a predetermined period.

Also, a single recommended service log may be classified into the consonant/vowel unit, the syllable unit, or the suffix according to the indexing methods. As an example, a recommended service log 'naver' may be indexed into 'n,' 'na,' 'nav,' 'nave,' and 'naver' according to the consonant/vowel unit, may be indexed into 'na' and 'naver' according to the syllable unit, and may also be indexed into 'ver,' 'aver' and 'naver' according to the suffix.

The suffix is a kind of affix, and is added to the end of a word to add a meaning, and thereby generally generates another word. Also, the suffix may not be used alone, and is combined to an end of the root of a word to add various meanings. However, in the present invention, the term "suffix" includes the same usage as in the English language, and also designates all the words and characters which can be added to a tail of a word.

As an example, 'bank' does not correspond to a general meaning of a suffix, but can be added to the end of another word, such as 'Kookmin Bank,' 'Woori Bank' and the like. Accordingly, in the present invention, 'bank' falls within the scope of the suffix. As described above, in the present invention, the 'suffix' corresponds to 'a syllable unit index from an end of a word'. As an example, a term 'dic surgery' itself may not be a complete noun, such as 'bank', but completes a query such as 'Miso Medic Surgery' and 'Hongildong Orthopedic Surgery. Accordingly, 'dic surgery' also falls within the scope of the suffix.

In operation S202, the system 100 for providing the user-customized recommended word classifies the indexed recommended service log according to the consonant/vowel unit index, the syllable unit index or the suffix index, and stores the classified recommended service log in the user-customized recommended word storage unit 102.

Figure 3:
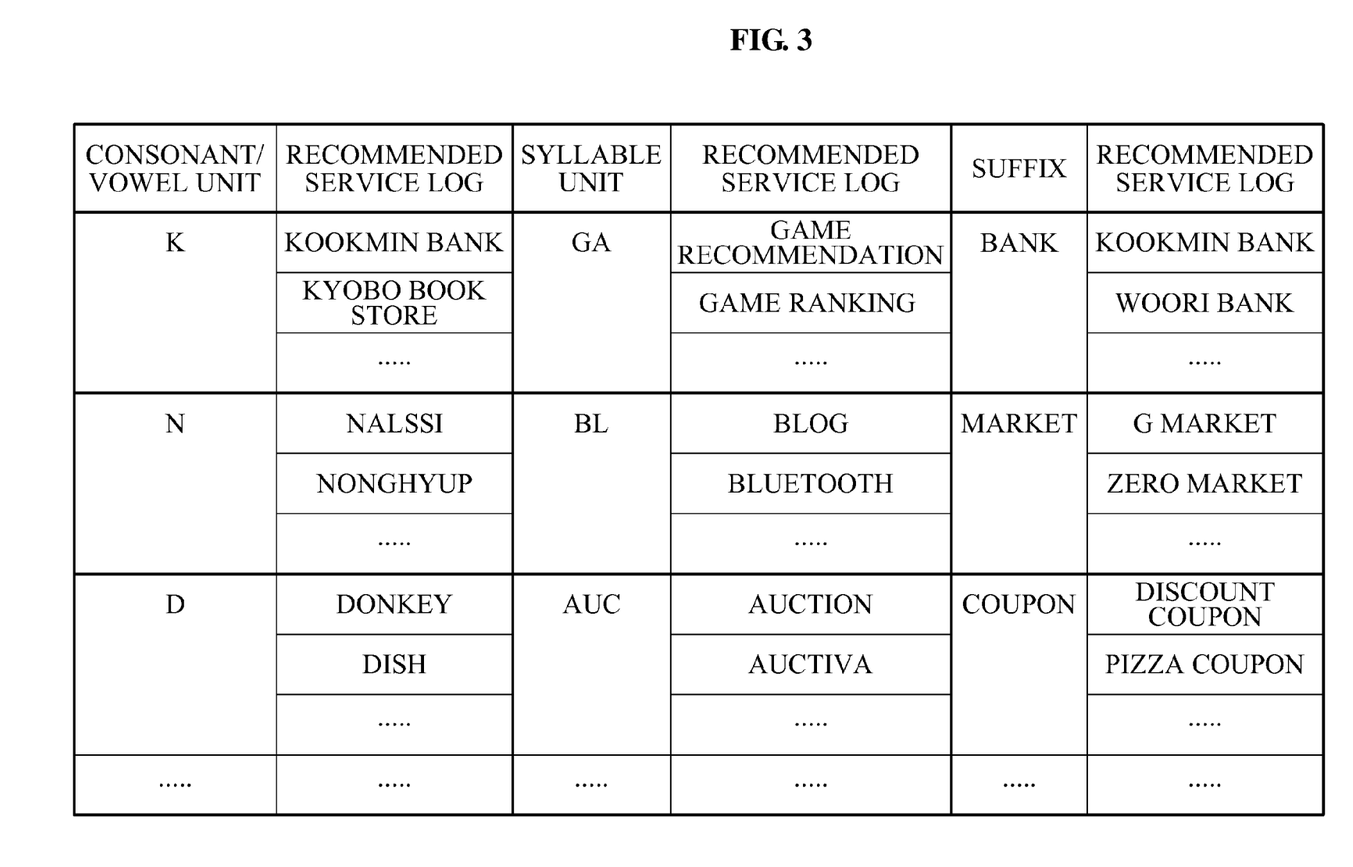
FIG. 3 is a diagram illustrating an example of the user-customized recommended word storage unit according to an embodiment of the present invention.

FIG. 3 is a diagram illustrating an example of the user-customized recommended word storage unit 102 according to the present invention.

According to the present invention, the user-customized recommended word storage unit 102 may include each consonant/vowel unit and a recommended service log according to the each consonant/vowel as a consonant/vowel unit index. In this instance, the user-customized recommended word storage unit 102 may arrange to store the recommended service log according to the search frequency. As an example, 'Kookmin Bank,' 'Kyobo Book Store' and the like may be stored as recommended service logs for a consonant/vowel unit 'k'; 'Nalssi,' 'Nonghyup' and the like may be stored as recommended service logs for a consonant/vowel unit 'n'; and 'donkey,' 'dish' and the like may be stored as recommended service logs for a consonant/vowel unit 'd.'

Also, the user-customized recommended word storage unit 102 may include each syllable unit and a recommended service log according to the each syllable for a syllable unit index. As an example, 'game recommendation,' 'game ranking' and the like may be stored as recommended service logs for a syllable unit 'Ga'; 'blog,' 'bluetooth' and the like may be stored as recommended service logs for a syllable unit 'bl'; and 'auction,' 'auctiva' and the like may be stored as recommended service logs for a syllable unit 'auc.'

Also, the user-customized recommended word storage unit 102 may include each suffix and a recommended service log according to the each suffix for a suffix index. As an example, 'Kookmin Bank,' 'Woori Bank' and the like may be stored as recommended service logs for a suffix unit 'bank'; 'G Market,' 'Zero Market' and the like may be stored as recommended service logs for a suffix unit 'market'; and 'discount coupon,' 'Pizza coupon' and the like may be stored as recommended service logs for a suffix unit 'coupon.'

Accordingly, the single recommended service log may be classified using a single index, and also may be classified into the consonant/vowel unit, the syllable unit, or the suffix depending on its indexed methods, and consequently, may be stored in the user-customized recommended word storage unit 102. As an example, the recommended service log 'naver' may be stored in a consonant/vowel unit index 'n' may be stored in a syllable unit index 'na,' and also may be stored in a suffix index 'ver.'

According to another embodiment of the present invention, the user-customized recommended word storage unit 102 arranges and stores the recommended service log according to search frequencies, and therefore a user-customized recommended word may be easily extracted. Also, the system 100 for providing the user-customized recommended word updates the recommended service log stored in the user terminal in the order of the search frequencies, and consequently may regularly update the recommended service log which is frequently inputted from the user.

In operation S203, the system 100 for providing the user-customized recommended word identifies a user input query being inputted to a web browser of the user. The user input query is a kind of a keyword such as the recommended service log, and the user inputs the user input query to the web browser in real time. In this instance, according to the embodiment of the present invention, the user may input a setting mode along with the user input query, and the setting mode may include selection information about at least one selected from the group consisting of the consonant/vowel unit index, the syllable unit index, and the suffix index.

In operation S204, the user-customized recommended word extraction unit 103 of the system 100 for providing the user-customized recommended word extracts at least one user-customized recommended word associated with the user input query from the user-customized recommended word storage unit 102. In this instance, when the user input query and the setting mode are simultaneously inputted, the system 100 for providing the user-customized recommended word may extract at least one user-customized recommended word, among recommended service logs corresponding to the selected index, from the user-customized recommended word storage unit 102.

According to the embodiment of the present invention, the system 100 for providing the user-customized recommended word may extract a predetermined number of user-customized recommended words in an order of search frequency. As an example, when the user inputs 'c' to a search window, the system 100 for providing the user-customized recommended word may not extract all user-customized recommended words starting with 'c'; instead, it may extract tens of, or merely three to four of, most frequently searched user-customized recommended words. Accordingly, only most probable user-customized recommended words may be provided for the user.

In operation S205, the user-customized recommended word output unit 104 of the system 100 for providing the user-customized recommended word outputs the extracted user-customized recommended word or words to the web browser. According to the embodiment of the present invention, the system 100 for providing the user-customized recommended word divides an output area of the web browser into a first output area and a second output area, outputs the extracted user-customized recommended word or words to the first output area, and outputs a general autocomplete recommended word or words to the second output area.

Also, the system 100 for providing the user-customized recommended word may understand a user' inclination using the recommended service log, and may output an appropriate advertisement recommended word or words according to the user's inclination along with the user-customized recommended word or words.

Figure 4:
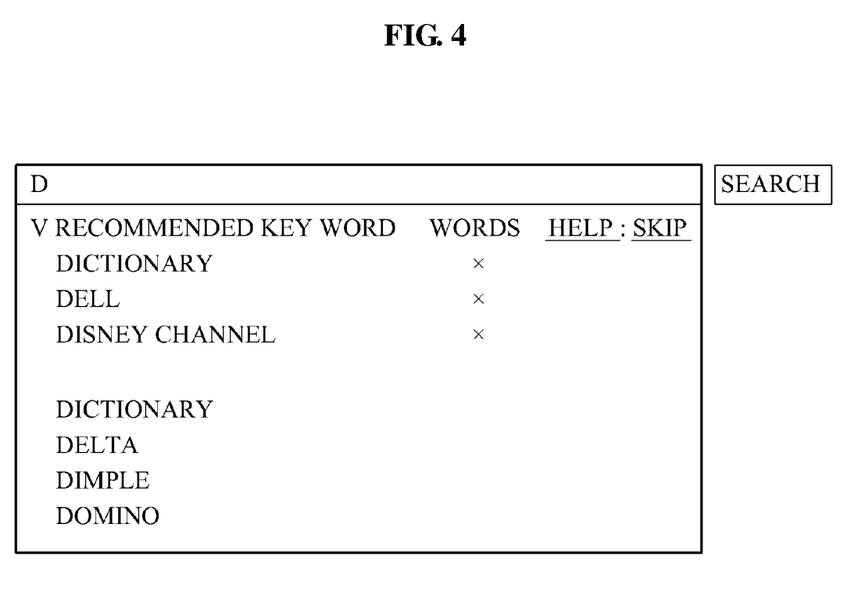
FIG. 4 is a diagram illustrating an example of a user-customized recommended word list which is provided from a system for providing a user-customized recommended word according to an embodiment of the present invention.

FIG. 4 is a diagram illustrating an example of a user-customized recommended word list which is provided from the system 100 for providing the user-customized recommended word according to the present invention.

As illustrated, the system 100 for providing the user-customized recommended word, by performing operations S101 through S104, outputs below the search window the user user-customized recommended word list which includes user user-customized recommended words which are classified into 'd', such as 'dictionary,' 'dell,' 'disney channel' and the like, and general autocomplete recommended words such as 'dictionary,' 'delta,' 'dimple,' 'domino' and the like.

As illustrated, the system 100 for providing the user-customized recommended word outputs the user user-customized recommended words to an upper area of the output area, i.e. the first output area, and outputs the general autocomplete recommended words to a lower area of the output area, i.e. the second output area. In this instance, the user may select a search word from the recommended words to be inputted using a mouse or an arrow indicator.

In the meantime, the system 100 for providing the user-customized recommended word may exclusively output the user user-customized recommended words, and may output an advertisement recommended word or words instead of the general autocomplete recommended words. Also, the system 100 for providing the user-customized recommended word may divide the output area into the first output area, the second area, and a third area, and may output the user-customized recommended words, the general autocomplete recommended words, and the advertisement recommended word or words.

Figure 5:
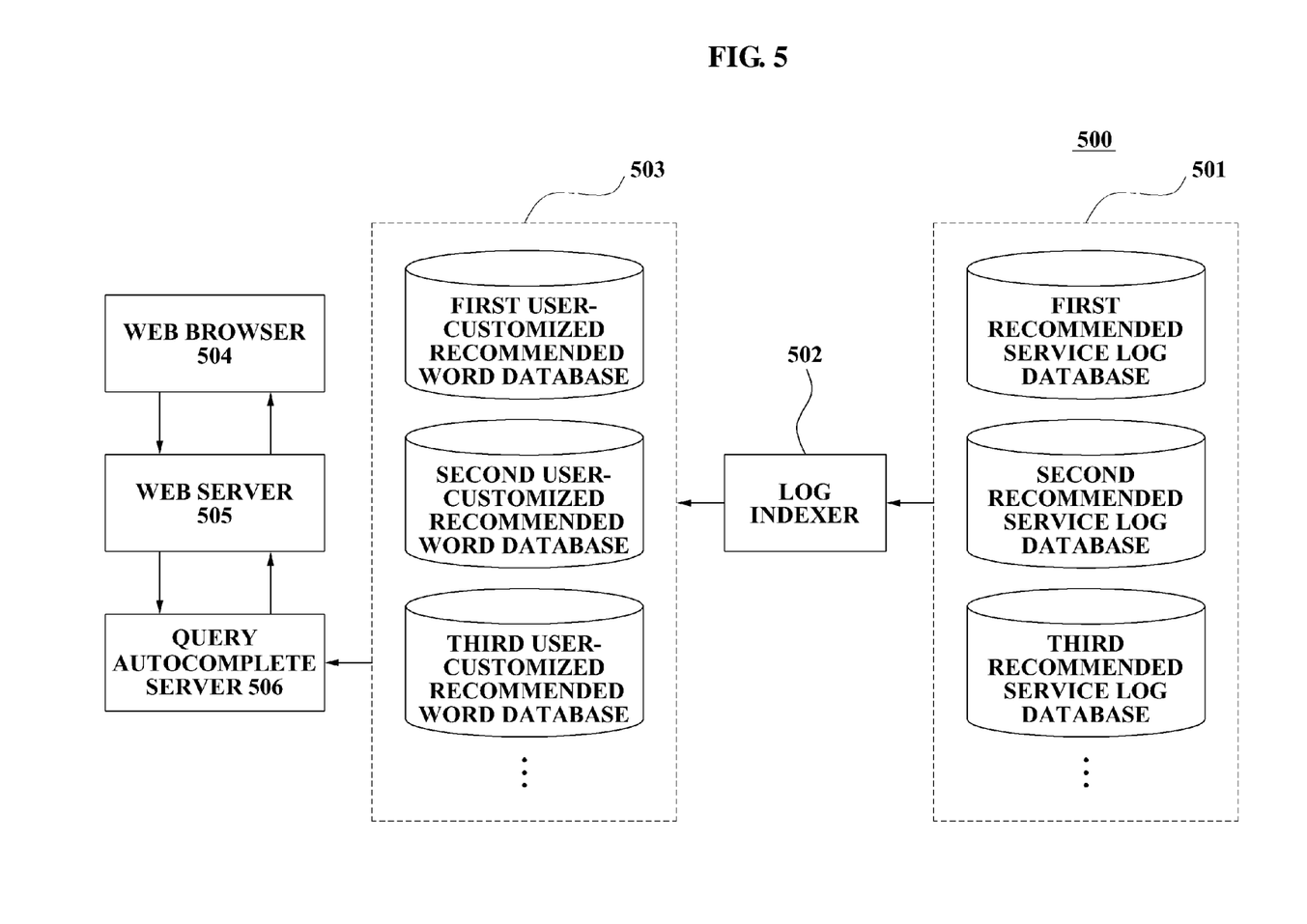
FIG. 5 is a block diagram illustrating a configuration of a system for providing a user-customized recommended word according to another embodiment of the present invention.

FIG. 5 is a block diagram illustrating a configuration of a system 500 for providing a user-customized recommended word according to another embodiment of the present invention.

The system 500 for providing the user-customized recommended word according to another embodiment of the present invention includes a recommended service log database 501, a log indexer 502, a user-customized recommended word database 503, a web server 505, and a query autocomplete server 506. The recommended service log database 501 classifies a recommended service log for each user, and stores the classified recommended service log for each user. The log indexer 502 indexes a recommended service log stored in the recommended service log database 501 according to a consonant/vowel unit, a syllable unit, or a suffix. The user-customized recommended word database 503 classifies the indexed recommended service log according to the consonant/vowel unit index, the syllable unit index, or the suffix index, and stores the classified recommended service log for each user. The web server 505 receives a user input query from a web browser 504 of the user, identifies user identification information of the user, who has inputted the user input query, transmits the user identification information to the query autocomplete server 506, receives at least one user-customized recommended word from the query autocomplete server 506, and transmits the user-customized recommended word or words to the web browser. The query autocomplete server 506 receives the user input query and the user identification information from the web server 505, and extracts the user-customized recommended word or words associated with the user input query from the user-customized recommended word database 503 associated with the user identification information to transmit the extracted user-customized recommended word or words to the web server 505.

According to the another embodiment of the present invention, the system 500 for providing the user-customized recommended word respectively maintains the user-customized recommended word databases 503 for each user, such as a first user-customized recommended word database, a second user-customized recommended word database, a third user-customized recommended word database, and the like, and provides the each user with a user-customized recommended word or words associated with the each user.

Figure 6:
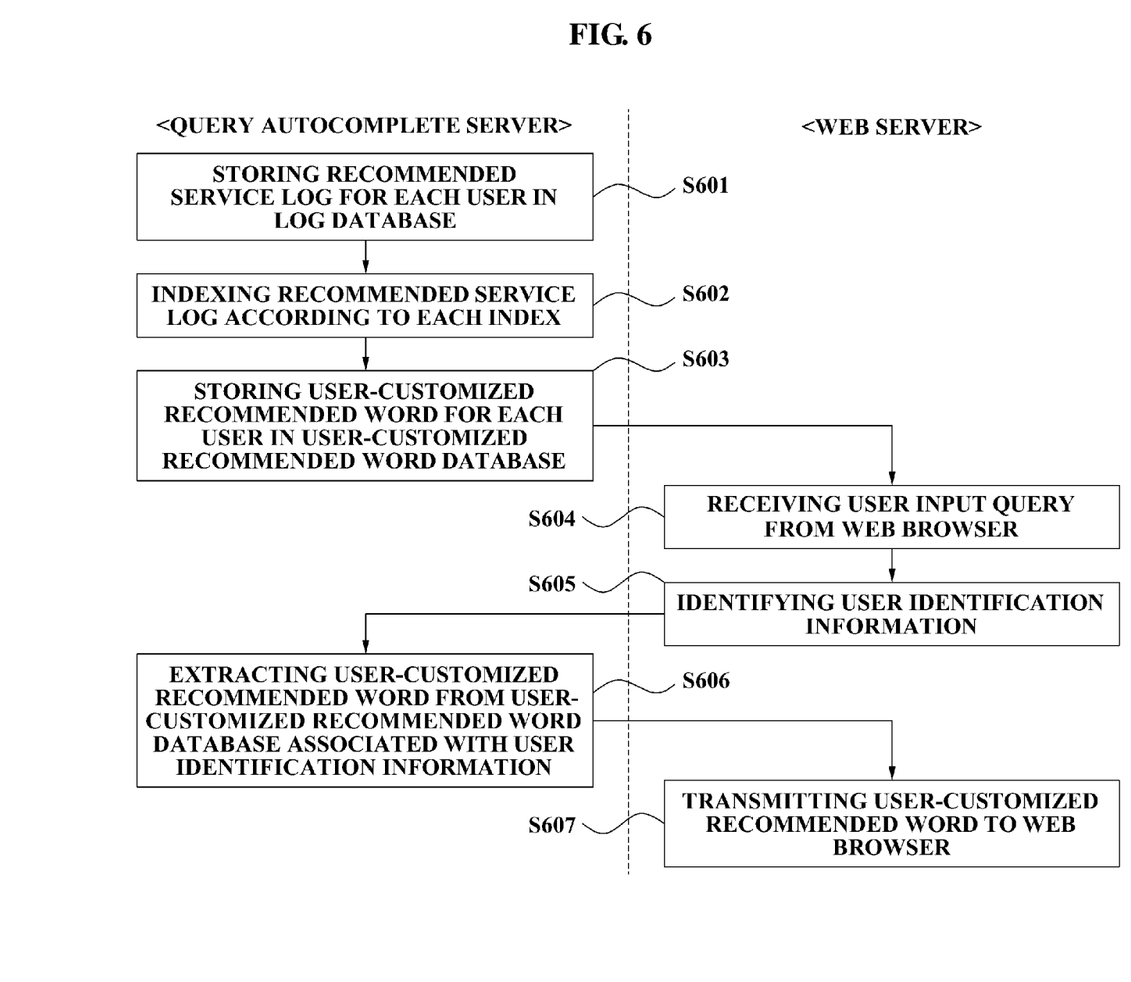
FIG. 6 is a flowchart illustrating a method for providing a user-customized recommended word according to another embodiment of the present invention.

FIG. 6 is a flowchart illustrating a method for providing a user-customized recommended word according to another embodiment of the present invention. The method for providing the user-customized recommended word according to the other embodiment of the present invention may be performed by the system 500 for providing user-customized recommended word as illustrated in FIG. 5.

In operation S601, the query autocomplete server 506 of the system 500 for providing user-customized recommended word classifies a recommended service log according to each user, and stores the classified recommended service log in the recommended service log database 501.

As described in FIG. 2, the recommended service log is a keyword being inputted by a user, in the specification of the present invention, a recommended service log being inputted by each user may be respectively stored.

According to an embodiment of the present invention, the system 500 for providing the user-customized recommended word may store the recommended service log in the first recommended service log database 501, the second recommended service log database 501, or the third recommended service log database 501 in association with user identification information by using a user ID, IP address information, or cookie information of a user as the user identification information.

According to another embodiment of the present invention, the system 500 for providing the user-customized recommended word may separately store the recommended service log, and may store an identifier about the recommended service log in the recommended service log database 501 in association with the user identification information.

In operation S602, the log indexer 502 indexes the recommended service log stored in the recommended service log database 501 according to a consonant/vowel unit, a syllable unit, or a suffix. The method of indexing the recommended service log is identical to the method of indexing the recommended service log described in FIG. 2.

In operation S603, the query autocomplete server 506 classifies the indexed recommended service log according to the consonant/vowel unit index, the syllable unit index, or the suffix index, and stores the classified recommended service log for each user.

According to an embodiment of the present invention, the system 100 for providing the user-customized recommended word may store the user-customized recommended word database 503 in association with the user ID. As an example, the system 100 for providing the user-customized recommended word may store the first user-customized recommended word database 503 in association with 'abc123', and may store the first user-customized recommended word database 503 in association with 'def456'. In this instance, the system 100 for providing the user-customized recommended word may store a keyword, which is inputted after user's log-in as the recommended service log, and may store the user-customized recommended word, which is indexed according to each index, with respect to the recommended service log.

Also, the system 100 for providing the user-customized recommended word may store the user-customized recommended word database 503 in association with the IP address information. An IP address corresponds to a physical network address on an Internet, and since a host may be identified when the IP address is identified, a user who has inputted the keyword may be identified. As an example, the third user-customized recommended word database 503 may be stored in association with IP address information "192.168.1.2", and the fourth user-customized recommended word database 503 may be stored in association with IP address information "192.168.102.5". Users generally use the Internet at home, at school, in the office, and the like, and since IP addresses are different according to where the user use the Internet, the different IP addresses may be respectively stored in each of the user-customized recommended word databases 503, i.e. the first user-customized recommended word databases 503, the second user-customized recommended word databases 503, the third user-customized recommended word databases 503, or the fourth user-customized recommended word databases 503. Accordingly, a provided user-customized recommended word or words when a keyword is inputted at home may be different from a provided user-customized recommended word or words when a keyword is inputted in the office, and a provided user-customized recommended word or words when a keyword is inputted at home may be identical to a provided user-customized recommended word.

Also, the system 100 for providing the user-customized recommended word may store the user-customized recommended word databases 503 in association with cookie information. As described above, the cookie information is information about a keyword which has been inputted by a user on an Internet search site, and the system 100 for providing the user-customized recommended word may store the user-customized recommended word databases 503 by using the cookie information as user identification information.

In operation S604, the web server 505 may receive a user input query from a web browser 504 of the user. According to an embodiment of the present invention, the user may input a setting mode along with the user input query, and the setting mode may include selection information about at least one selected from the group consisting of the consonant/vowel unit index, the syllable unit index, and the suffix index.

In operation S605, the web server 505 may identify the user identification information of the user, who has inputted the user input query, and may transmit the user identification information to the query autocomplete server 506. As described above, the web server 505 may identify a user ID, IP address information, or cookie information of the user as the user identification information, and may transmit the identified user identification information and the user input query to the query autocomplete server 506. In this instance, when the user input query and the setting mode are simultaneously inputted, the setting mode may be transmitted to the query autocomplete server 506.

In operation S606, the query autocomplete server 506 may receive the user input query and the user identification information from the web server 505, and may extract at least one user-customized recommended word associated with the user input query from the user-customized recommended word database 503 associated with the user identification information. According to the embodiment of the present invention, the query autocomplete server 506 may extract a predetermined number of user-customized recommended words in an order of search frequency from the user-customized recommended word database 503 associated with the user identification information. In this instance, when the setting mode is inputted along with the user input query, the query autocomplete server 506 may extract at least one user-customized recommended word, among recommended service logs corresponding to the selected index. The query autocomplete server 506 may transmit the extracted user-customized recommended word or words to the web server 505.

In operation S607, the web server 505 may receive the extracted user-customized recommended word or words, and may transmit the received user-customized recommended word or words to the web browser 504. As described above, an output area of the web browser 504 is divided into a first output area and a second output area, outputs the user-customized recommended word or words to the first output area, and outputs a general autocomplete recommended word or words to the second output area.

As described above, according to the present invention, an individualized search guide service may be provided for each user by providing a user-customized recommended word.

The method for providing a user-customized recommended word according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, there is provided a method and system for providing a user-customized recommended word or words, in which a recommended service log stored in a user terminal is classified according to at least one index, the indexed recommended service log is respectively stored for each index, and the user-customized recommended word or words are extracted in association with a user input query being inputted to a web browser of a user.

Also, according to the present invention, there is provided a method and system for providing a user-customized recommended word or words, in which a user can easily input a keyword without having to input a complete keyword by selecting the keyword from a user-customized recommended word or words provided to the user.

Also, according to the present invention, there is provided a method and system for providing a user-customized recommended word or words, which can respectively provide each user with a different user-customized recommended word or words since a recommended service log is classified to be stored for the each user, the recommended service log is indexed according to each index to be stored for the each user, a user input query being inputted to a web browser of the user is identified, and a user-customized recommended word or words associated with the user input query are provided in the recommended service log associated with the user.

Also, according to the present invention, there is provided a method and system for providing a user-customized recommended word or words, which can identify a user who has inputted a user input query by using a user identification (ID), IP address information, and cookie information of the user.

The invention claimed is:

1. A system for providing a user-customized recommended word, comprising:
a log database to store a service log comprising search words received at a terminal;
a log indexer configured to index the service log by a consonant/vowel unit, a syllable unit, and a suffix;
a data storage device configured to store the indexed service log, according to the consonant/vowel unit index, the syllable unit index, and the suffix index, in association with the terminal or a user of the terminal;
a user-customized recommended word extraction unit configured to identify a user input query being inputted to a web browser at the terminal and configured to extract at least one user-customized recommended word associated with the user input query, from the service log stored in association with the terminal or the user; and
a user-customized recommended word output unit configured to output the at least one extracted, user-customized recommended word to the web browser,
wherein the user-customized recommended word extraction unit is further configured to identify at least one of a consonant/vowel unit input mode, a syllable unit input mode, and a suffix input mode where the consonant/vowel unit index, the syllable unit index, and the suffix index, respectively, apply to the user input query being inputted to the web browser, and
wherein the user-customized recommended word extraction unit is further configured to extract from the data storage device at least one user-customized recommended word of the service log according to the identified at least one of the consonant/vowel unit input mode, the syllable unit input mode, and the suffix input mode corresponding to the consonant/vowel unit index, the syllable unit index, and the suffix index, respectively.

2. The system of claim 1, wherein the system for providing the user-customized recommended word is installed in the terminal, and the indexed service log is stored using cookie information of the terminal.

3. The system of claim 1, wherein the user-customized recommended word output unit is configured to display an output area along with an input area for receiving the user input query on the web browser and divide the output area into a first output area and a second output area, configured to output the at least one extracted, user-customized recommended word to the first output area, and configured to output a general autocomplete recommended word to the second output area.

4. The system of claim 1, wherein the mode is set with respect to the user input query being received.

5. The system of claim 1, wherein the data storage device is configured to store the indexed service log according to search frequencies of the search words, and the user-customized recommended word extraction unit is configured to extract from the indexed service log associated with the user input query the at least one user-customized recommended word in an order of the search frequencies.

6. A system for providing a user-customized recommended word, comprising:
a service log database configured to store a plurality of service logs comprising first and second service logs for a plurality of users comprising first and second users, the first service log stored in association with the first user and comprising first search words received from the first user, and the second service log stored in association with the second user and comprising second search words received from the second user;

a log indexer configured to index the stored plurality of service logs comprising the first and second service logs according to a consonant/vowel unit, a syllable unit, and a suffix;

a data storage device configured to classify the indexed plurality of service logs according to the consonant/vowel unit index, the syllable unit index, and the suffix index and configured to store a user-customized recommended word database comprising the classified plurality of service logs, a classified first service log being stored in association with the first user, and a classified second service log being stored in association with the second user;

a web server configured to receive a user input query from a web browser of the first user, configured to identify user identification information of the first user inputting the user input query, configured to transmit the user identification information to a query autocomplete server, configured to receive at least one user-customized recommended word from the query autocomplete server, and configured to transmit the at least one user-customized recommended word to the web browser; and a query autocomplete server configured to receive the user input query and the user identification information from the web server, and configured to extract the at least one user-customized recommended word associated with the user input query from the classified first service log in association with the first user stored in the user-customized recommended word database in response to identifying the first user based on the user identification information to transmit the extracted, at least one user-customized recommended word to the web server, wherein the query autocomplete server is further configured to identify at least one of a consonant/vowel unit input mode, a syllable unit input mode, and a suffix input mode where the consonant/vowel unit index, the syllable unit index, and the suffix index, respectively, apply to the user input query being inputted to the web browser, and wherein the query autocomplete server is further configured to extract from the data storage device at least one user-customized recommended word of the service log according to the identified at least one of the consonant/vowel unit input mode, the syllable unit input mode, and the suffix input mode corresponding to the consonant/vowel unit index, the syllable unit index, and the suffix index, respectively.

7. The system of claim 6, wherein the web server is configured to identify a user identification (ID) of the user identification information, the user-customized recommended word database is configured to store the plurality of service logs in association with user IDs, and the query autocomplete server is configured to extract the at least one user-customized recommended word from the user-customized recommended word database associated with the user ID.

8. The system of claim 6, wherein the web server is configured to identify an IP address of the first user for the user identification information, the user-customized recommended word database is configured to store the plurality of service logs in association with IP address information, and the query autocomplete server is configured to extract the at least one user-customized recommended word from the user-customized recommended word database associated with the IP address.

9. The system of claim 6, wherein the web server is configured to identify a cookie of the first user, the user-customized recommended word database is configured to store the indexed plurality of service logs in association with cookie information, and the query autocomplete server is configured to extract the at least one user-customized recommended word from the user-customized recommended word database associated with the cookie information.

10. The system of claim 6, wherein the data storage device is configured to store the classified plurality of service logs with respect to a search frequency of each of the search words, the search frequency being a number of times that each of the search words occurs in the service log stored in the terminal.

11. A method that uses a processor to provide a user-customized recommended word, comprising:
  receiving search words at a terminal and storing a service log comprising the received search words;
  indexing the stored service log according to a consonant/vowel unit, a syllable unit, and a suffix;
  classifying, by the processor, the indexed service log according to the consonant/vowel unit index, the syllable unit index, and the suffix index, and storing the classified service log on a data storage;
  identifying a user input query being inputted to a web browser on the terminal;
  extracting at least one user-customized recommended word associated with the user input query from the service log stored on the terminal; and
  outputting the extracted, at least one user-customized recommended word to the web browser on the terminal,
  wherein identifying comprises identifying at least one of a consonant/vowel unit input mode, a syllable unit input mode, and a suffix input mode where the consonant/vowel unit index, the syllable unit index, and the suffix index, respectively, apply to the user input query being inputted to the web browser, and
  wherein extracting comprises extracting from the data storage at least one user-customized recommended word of the service log according to the identified at least one of the consonant/vowel unit input mode, the syllable unit input mode, and the suffix input mode corresponding to the consonant/vowel unit index, the syllable unit index, and the suffix index, respectively.

12. The method of claim 11, wherein the method for providing the user-customized recommended word is performed in the terminal, and the search words are stored using cookie information in the terminal.

13. The method of claim 11, wherein the outputting of the extracted, at least one user-customized recommended word to the web browser comprises:
  classifying an output area of the web browser into a first output area and a second output area; and
  outputting the at least one user-customized recommended word to the first output area, and outputting at least one general autocomplete recommended word to the second output area.

14. The method of claim 11, wherein the mode is set with respect to the user input query being received.

15. A non-transitory computer-readable storage medium storing a program for implementing the method of claim 11.

16. A method that uses a processor to provide a user-customized recommended word, comprising:
  storing a plurality of service logs comprising first and second service logs for a plurality of users comprising first and second users in a service log database, the first service log stored in association with the first user and comprising first search words received from the first user, and the second service log stored in association with the second user and comprising second search words received from the second user;

indexing the stored plurality of service logs comprising the first and second service logs according to a consonant/vowel unit, a syllable unit, and a suffix, from a log indexer;

classifying, by the processor, the indexed plurality of service logs according to the consonant/vowel unit index, the syllable unit index, and the suffix index, and storing the classified plurality of service logs in association with the plurality of users, respectively;

receiving a user input query in a web server from a web browser of the first user, identifying user identification information of the first user inputting the user input query, and transmitting the user identification information to a query autocomplete server;

receiving the user input query and the user identification information from the web server in the query autocomplete server, extracting at least one user-customized recommended word associated with the user input query from the classified first service log in association with the first user stored in the user-customized recommended word database in response to identifying the first user based on the user identification information, and transmitting the extracted, at least one user-customized recommended word to the web server; and receiving the at least one user-customized recommended word from the query autocomplete server in the web server, and transmitting the received, at least one user-customized recommended word to the web browser, wherein receiving comprises identifying at least one of a consonant/vowel unit input mode, a syllable unit input mode, and a suffix input mode where the consonant/vowel unit index, the syllable unit index, and the suffix index, respectively, apply to the user input query being inputted to the web browser, and wherein extracting comprises extracting from the data storage at least one user-customized recommended word of the service log according to the identified at least one of the consonant/vowel unit input mode, the syllable unit input mode, and the suffix input mode corresponding to the consonant/vowel unit index, the syllable unit index, and the suffix index, respectively.

17. The method of claim 16, wherein the identifying of the user identification information of the first user comprises identifying a user ID of the first user for the user identification information, the storing of the indexed service log in the user-customized recommended word database comprises storing the service log for each index in association with the user ID, and the extracting at least one user-customized recommended word associated with the user input query comprises extracting the at least one user-customized recommended word from the user-customized recommended word database associated with the user ID.

18. The method of claim 16, wherein the identifying of the user identification information of the first user comprises identifying IP address information of the first user for the user identification information, the storing of the indexed service log in a user-customized recommended word database comprises storing the service log for each index in association with the IP address information, and the extracting at least one user-customized recommended word associated with the user input query comprises extracting the at least one user-customized recommended word from the user-customized recommended word database associated with the IP address information.

19. The method of claim 16, wherein the identifying of the user identification information of the user comprises identifying cookie information of the first user for the user identification information, the storing of the indexed service log in the user-customized word database comprises storing the indexed service log for each index in association with cookie information, and the extracting at least one user-customized recommended word associated with the user input query comprises extracting the at least one user-customized recommended word from the user-customized recommended word database associated with the cookie information.

20. A non-transitory computer-readable storage medium storing a program for implementing the method of claim 16.

* * * * *